Feb. 6, 1968 C. M. TARIS 3,368,211

VERIFICATION OF NRZI RECORDING

Filed July 26, 1965 4 Sheets-Sheet 1

INVENTOR
C. M. TARIS
BY E J Olinder
ATTORNEY

VERIFICATION OF NRZI RECORDING

Filed July 26, 1965

| | READ 1 | READ 0 |
|---|---|---|
| WRITE 1 WITH − ϕ PULSE | T | F |
| WRITE 0 WITH + ϕ PULSE | F | T |
| WRITE 1 WITH + ϕ PULSE | F | T |
| WRITE 0 WITH − ϕ PULSE | T | F |

United States Patent Office 3,368,211 Patented Feb. 6, 1968

3,368,211

VERIFICATION OF NRZI RECORDING

Charles M. Taris, Cranford, N.J., assignor to Bell Telephone Laboratories, Incorporated, New York, N.Y., a corporation of New York Filed July 26, 1965, Ser. No. 474,637
26 Claims. (Cl. 340—174.1)

This invention relates to magnetic digital recording apparatus and more particularly to incremental type tape recorders.

Many systems exist for recording binary-coded data on both a continuously moving magnetic tape and one moving in discrete increments, the more common of these being: RB—return to bias; RZ—return to zero; NRZC—non-return to zero, flux change on 1 or 0; and NRZM—non-return to zero, flux change on 1. In the RB system magnetic saturation in one direction is considered a zero and ones are represented by saturation in the opposite direction. In the RZ scheme ones are represented by saturation in one direction and zeros by saturation in the opposite direction where each one or zero is separated from adjacent ones or zeros by portions in which the tape is magnetically neutral. In NRZ systems the binary bits are represented by a change or the absence of a change in tape saturation direction or polarity. In the NRZC method, tape polarity is changed whenever any change of binary input occurs, e.g., from zero to one or from one to zero. In the NRZM system (better known as NRZI), tape polarity is changed only on receipt of a binary one and does not change for recording of a binary zero.

Of these basic schemes, the NRZI system is generally preferred because it permits a closer packing of polarity or flux changes along the length of the tape (called bit density or character density) and provides a maximum of magnetic flux energy in each recorded binary 1 bit to facilitate reliable reading. Also, a recent American Standards Association proposal that all magnetic tapes for input to an electronic data processor be recorded in NRZI with a nominal bit density of 200 bits per inch further establishes this system. Importantly, the same standard prescribes that only one flux change (transition) shall be present on the tape for a given binary 1 bit.

NRZI recording typically involves running a magnetic tape at constant speed past a multi-track recording head in which recording current of one polarity or of the opposite polarity is constantly present in the head windings, one for each track. The tape so produced consists of a flux pattern in each track, in which each flux transition represents the recording of a binary 1 and no flux transition represents the recording of a binary 0. The combination of ones and zeros recorded by the multi-track head constitutes the recorded character.

In many instances the generation of data to be recorded is intermittent or random. For these cases an incremental type recorder in which the tape is advanced only when data is generated and remains otherwise stationary is frequently desirable. However, recording techniques employed heretofore in incremental type magnetic tape recorders are either not suited for producing a tape fully compatible with the above-cited industry standard or are unable to achieve a character by character read-after-write verification of the recorded data, such as must be performed when any recording error whatsoever would be highly undesirable if not intolerable.

Incremental recorders using single-gap heads, one gap for each track, with current of one or the other polarity constantly present can readily enough produce an NRZI tape in which each transition stands for a separate bit. These recorders cannot read the character just written, however, because the current generated in a head winding by a recorded flux transition as it passes under the head gap must compete with the constantly present, much larger recording current. Under these conditions, the "read" pulse is not reliably detectable. A second gap may, of course, be added adjacent the write gap for performing the "read" function, allowing 150 mils or more of spacing for magnetic isolation of the gaps. Since the character spacing is but a small fraction of this, a considerable time lag occurs between the recording or "writing" of a given character and its arrival at the "read" gap. In this interval, numerous other characters are likely to be written. Elaborate data storage means are therefore required to retain data input in order to perform the type of write verification involving a character by character match of write input to read output or to be able to re-write the data in the event of a read "parity" failure if this type of verification is employed. Further, the tape stepping mechanism and write-to-read gap separation must be controlled very closely dimensionally in order to assure that the flux transition to be read during any particular step traverses the read gap at near maximum velocity to generate a reliable read pulse. The accuracy required to achieve this is not available in current tape transports.

Heretofore, then, the only practical method of vertifying a tape produced on an incremental machine utilizing NRZI recording has been the usual parity check on a separate steady speed machine, which for certain applications is entirely unsatisfactory since failures in recording in the incremental machine are not discovered until some time later, after the original data no longer exists.

Accordingly, an object of the invention is to eliminate the incidence of undetected recording errors produced by an incremental type magnetic tape recording machine.

Another object of the invention is to perform a character-by-character "read-after-write" verification on an incremental tape recorder while producing an NRZI-type recording.

These and other objects are achieved in accordance with the principles of the invention in an incremental type magnetic tape recorder by a recording head employing for each track or channel a single write-read gap which is greater in dimension (length) than the nominal character spacing on the tape.

Pursuant to the invention, the tape is first saturated or biased uniformly to a selected flux polarity and thereafter stepped to a first position beneath the head gap. A binary 1 is then written with a pulse of current through the head winding which establishes a tape flux under the gap of polarity opposite to the pre-bias condition. Flux transitions are thereby produced at the leading and trailing edges of the gap, each representing the 1 recorded. This input is also placed in a temporary storage. Current is then removed from the head and the tape is stepped a distance equal to the character spacing. During this step the trailing transition, representing the recorded 1, travels away from the gap and the leading transition moves beneath it, inducing a pulse in the head winding for verification. Because of the gap length, the leading transition remains, at the end of the step, within the gap and is therefore "erased" by the next write current pulse whether it be for writing a 1 or a 0. Since only the trailing transitions remain on the tape, the tape-step dimension alone determines the character spacing. Thus the new trailing transition is spaced the desired distance from the preceding trailing transition. The new leading transition in turn will be read and erased as described.

In accordance with another aspect of the invention, verification is performed by a logic unit which follows a special truth table in comparing the induced read pulse to the write input in the temporary storage. Although a write-input read-output match for each track and for each character affords a complete and preferred means of write verification, verification could also be achieved by forming parity with the read pulses as is done in usual digital recorders during the reading process.

As in the conventional NRZI recording practice, write current polarity is changed whenever a 1 is to be written. However, in accordance with a further aspect of the invention, the flux transition on the tape representing the 1 is produced by a pulse of current instead of a change in polarity of a steady-state write current. If a 0 is to be written, the write current polarity is left unchanged from that of the last recorded bit. Here also, in accordance with the invention, the 0 is written by a pulse of current through the head winding. To an electronic data processing machine, the tape so produced is indistinguishable from one recorded by the conventional NRZI practice which utilizes a steady state current in the head whose polarity is changed to write a 1 and left unchanged to write a 0.

In accordance with another aspect of the invention, the difference between gap length and stepping distance also offsets imprecise tape stepping by permitting the tape drive to overstep the tape an amount equal to said difference before the leading transition would escape erasure.

A further important aspect of the invention resides in its ability to pulse-write an NRZI tape by virtue of the head gap dimension being greater than the tape step dimension. As a consequence, although the instant disclosure is directed primarily to the incremental type of recorders, where the pulse writting permits novel write-read-verify schemes, the principles of the invention are also applicable to the usual digital recorders in which writing is performed while the tape is moving at a steady speed. Thus, by making the write pulse duration substantially shorter than the character-to-character timing and by making the gap length substantially greater than the character-to-character spacing, the leading-edge transition will always be erased, as noted above, resulting in a pulse-written NRZI tape. Further, if the pulse duration is made considerably less than the character timing (for example, 10 percent), transit of the leading transition across the gap will produce a read pulse thereby achieving a near-simultaneous write-read technique in a steady-speed digital recorder.

Accordingly, a prime feature of the invention relates to a magnetic tape recording head having a single read-write gap which is greater in length than the nominal character spacing on the tape.

Another feature of the invention relates to the recording, from a single magnetic head gap, of two similar tape conditions for each bit, one of which conditions produces a verifying signal in the head winding when the tape is next moved and is thereafter erased by the recording of the next bit.

A further feature of the invention involves an incremental type magnetic tape recorder in which a read-after-write function is achieved through a recording head employing for each track a single gap.

A still further feature of the invention resides in the producing of an NRZI tape by means of write current pulses through the winding of a head having a gap length substantially greater than the nominal character spacing on the tape.

These and other objects and features of the invention will be more fully apprehended in the detailed description to follow of an illustrative embodiment thereof and in the drawing in which.

Figure 1:
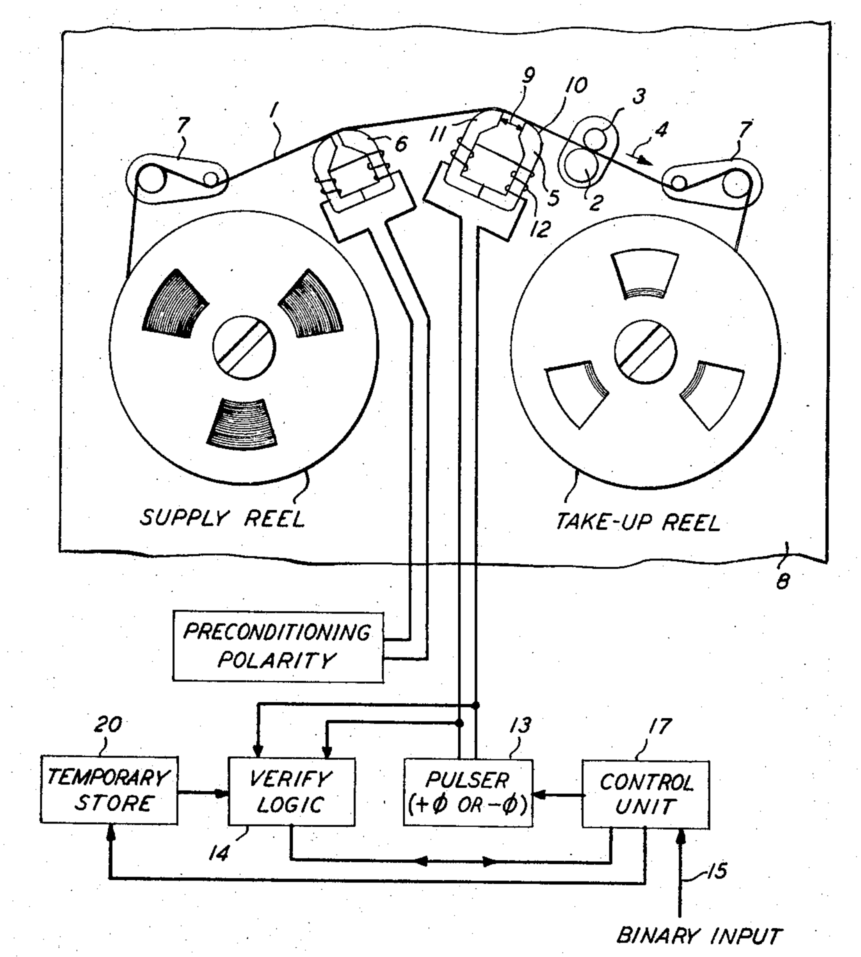
FIG. 1 shows schematically recording apparatus including control and logic functions shown in block form, embodying the inventive principles.

Referring to FIG. 1, there is shown a magnetic tape 1 moved by pinch roller 2 and capstan 3 attached to a stepping device (not shown) in equal incremental steps in the direction of arrow 4 across head 5. An erase head 6 applies a pre-conditioning bias of one polarity or another to tape 1. Tension arm 7 provides tension in tape 1 in order to maintain intimate tape-to-head contact while capstan 3 steps tape. The pinch roller-capstan arrangement, heads, tension arms and reels are supported conveniently on a surface 8 that forms a part of an incremental magnetic tape recording machine. For simplicity, FIG. 1 shows a head 5 for single-track recording; in actual practice, a number of identical structures, one for each track, would be aligned along a line perpendicular to the edge of the tape, thereby providing a parallel track arrangement for the simultaneous writing of all bits of a given character.

Head 5 comprises a gap 9 that is defined by the distance between a pair of parallel edges, namely, trailing edge 10 and leading edge 11. The length of gap 9 in accordance with the invention is selected to be greater than the bit-to-bit spacing to be produced on the tape. Winding 12 on head 5 is energized from a pulser 13 to produce changes in the magnetic polarity of the tape beneath gap 9, in a manner to be described. Winding 12 also passes a "read" current, generated when a magnetic flux transition on tape 1 travels under gap 9, to a logic unit 14 which performs a verifying function, also to be described. Binary data is presented to the recorder by way of lead 15.

FIGS. 2A through 2F show schematically the movement of tape 1 with respect to gap 9 and the various magnetic flux states in the tape imparted by pulses of one or the other polarity in head 5. It is assumed as in FIG. 2A that the tape has been pre-biased by erase head 6 in a direction designated $+\phi$. The distance between adjacent vertical lines represents the nominal bit spacing, or the distance that a given particle on tape 1 would be stepped ideally in each successive stepping action of pinch roller and capstan combination 2, 3. This nominal bit spacing is designated as 16.

Figures 2A, 2B, 2C, 2D, 2E, 2F:
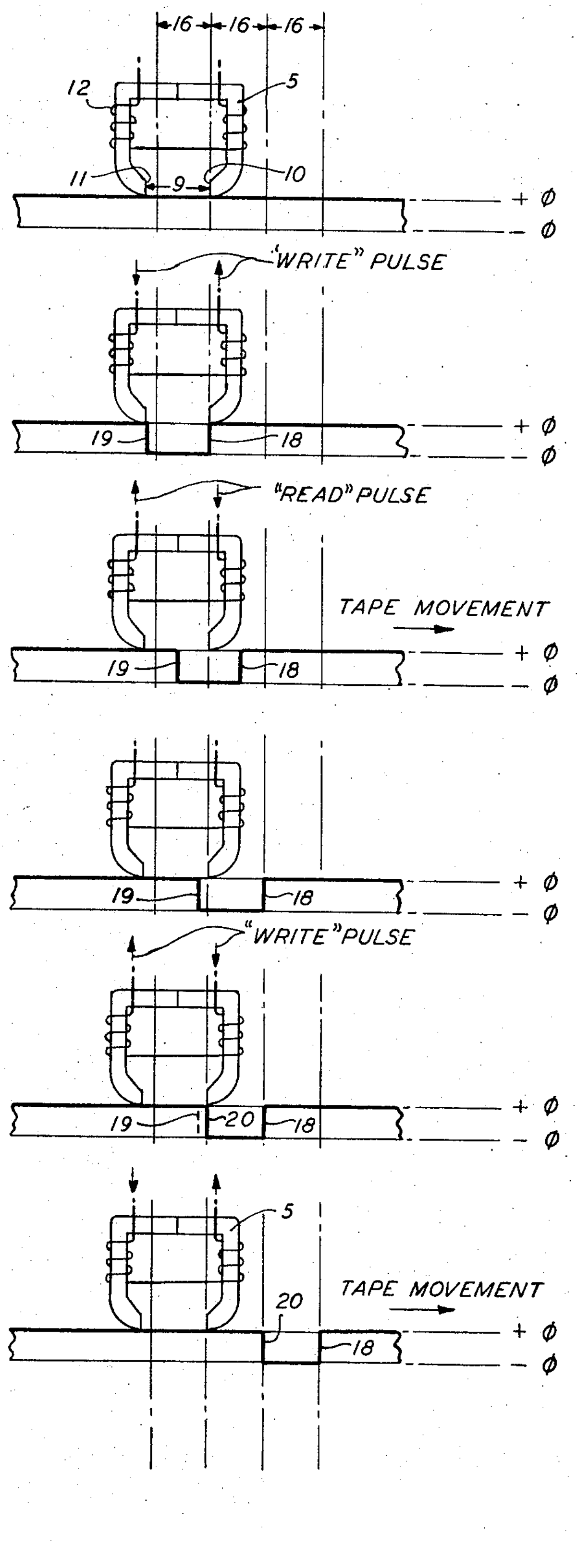
FIGS. 2A through 2F show schematically an illustrative method of recording.

FIG. 2A represents the starting point in which tape 1 is stationary and pre-biased arbitrarily with $+\phi$ bias. On receipt of a "1" over lead 15, a suitable control means such as control unit 17, causes pulser 13 to apply a pulse of current through head winding 12 of sufficient magnitude and duration to saturate tape 1 under the gap 9 in the $-\phi$ direction. The result shown in FIG. 2B is a pair of transitions, one from $+\phi$ to $-\phi$, the other from $-\phi$ to $+\phi$. The trailing transition, designated as 18, is lined up with trailing edge 10, while the leading transition 19 is lined up with leading edge 11. This input over lead 15 is also stored temporarily in temporary store 20, which may be any suitable means such as a flip-flop register.

In accordance with the invention the head current is turned off and thereafter tape 1 is stepped a distance equal to the nominal bit spacing, indicated as 16. During this step, as shown in FIG. 2C, leading transition 19 passes beneath head gap 9; the change in flux through magnetic core or head 5 generates a current pulse in winding 12. This pulse is transmitted to the verifying unit 14 where it is compared with the specific input which produced it. When the stepping of the tape is completed, transitions 18 and 19 are positioned as shown in FIG. 2D with respect to gap 9. As seen, leading transition 19 is still within gap 9 and would be thus, even if tape 1 had been overstepped slightly.

Assuming that the next binary input is a second 1, control unit 17 directs pulser 13 to pulse head 5 with current of polarity opposite to that which wrote the preceding 1. FIG. 2E shows the result. The previous leading transition 19 has been obliterated or erased and a new transition 20, representing the second 1 recorded, is spaced a distance equal to the required bit spacing from first transition 18.

The positions of the gap and flux transitions on the tape after two successive 1's have been written and the tape has been stepped twice are shown in FIG. 2F.

Figure 3A:
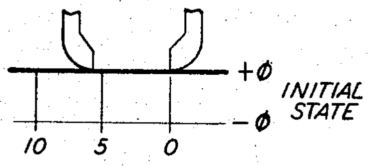
FIGS. 3 through 6 illustrate steps in verification.
Figure 4A:
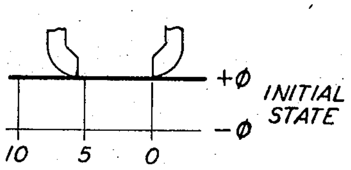
Figure 5A:
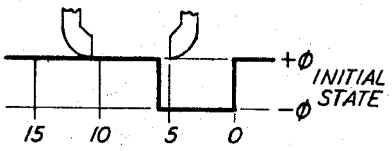
Figure 6A:
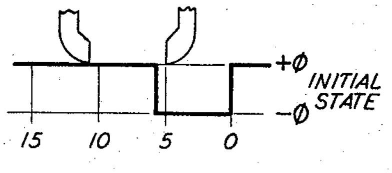

Four different "write" situations are possible. A "1" may be written by a head current pulse of one direction to change the tape flux from $+\phi$ to $-\phi$ as in FIGS. 3A–C; or by a head current pulse of the opposite direction to change the tape flux from $-\phi$ to $+\phi$ as in FIGS. 5A–C. A "0" may be written by a head current pulse of one direction to keep the tape flux at $+\phi$ as in FIGS. 4A–C; or of the opposite direction to keep the tape flux at $-\phi$ as in FIGS. 6A–C. In each situation, as the tape is stepped the bit spacing distance to the next "write" position, the magnetic condition last produced is drawn across the gap. The resultant signal occurring in the head winding, in accordance with the invention, is turned to account for read-after-write verification. This signal is an induced head voltage if the magnetic condition is a flux transition at the leading edge of the gap, as in FIGS. 3B and 6B; or the absence of an induced head voltage if the magnetic condition is a continuation of the previous flux state as in FIGS. 4B and 5B. Finally, each leading transition after serving its purpose is erased by the next pulsing of the head.

Figure 3B:
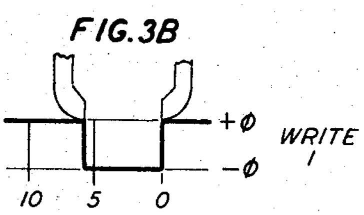
Figure 4B:
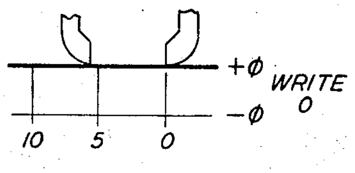
Figure 3C:
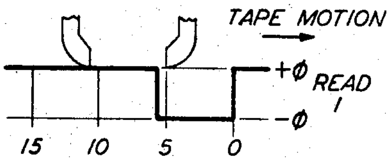
Figure 4C:
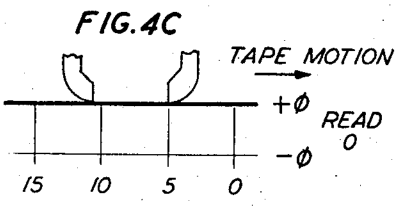
Figure 5B:
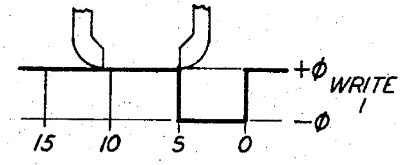
Figure 6B:
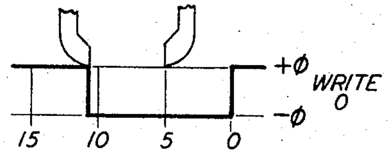
Figure 5C:
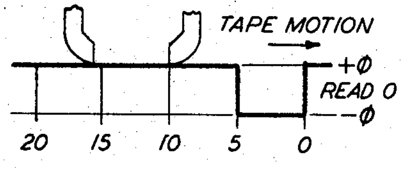
Figure 6C:
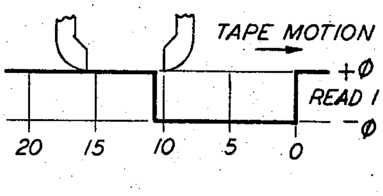

Each of the cited four "write" situations has corresponding "read" situations. Verifier 14 must take into account certain inherent logic inversions involved in two of the four write-read situations. As shown in FIG. 3B, with $+\phi$ flux already on the tape, a 1 is written by applying a current pulse which produces a $-\phi$ flux beneath the gap. As the tape is stepped beneath the gap a pulse is generated and a 1 is read by verifier 14. As shown in FIG. 4B, with $+\phi$ flux on the tape, a 0 is written by a current pulse which produces, or retains, a $+\phi$ flux on the tape, and, of course, no transition results. When the tape is stepped, no pulse is generated and therefore a 0 is read. For these two conditions there is a 1-to-1 correspondence between write and read; there are no logic inversions. As shown in FIG. 5B, however, with $-\phi$ tape flux, a 1 is written by a current pulse which imparts a $+\phi$ flux beneath the gap. When the tape is stepped, no transition passes beneath the gap, no voltage is generated and, accordingly, a 0 is read, although a 1 was written. Finally, as in FIG. 6B, with $-\phi$ flux on the tape, a 0 is written by pulsing the head so as to produce a continuation of the $-\phi$ flux. This, however, produces a flux transition beneath leading edge 11. Thereafter when the tape is stepped this transition passes beneath gap 9, and a 1 is read although a 0 was written. In the last two situations, write-to-read inversions occur but they are logically consistent and can be readily handled by conventional logic circuits in verifier 14.

Figures 7, 8A, 8B, 8C:
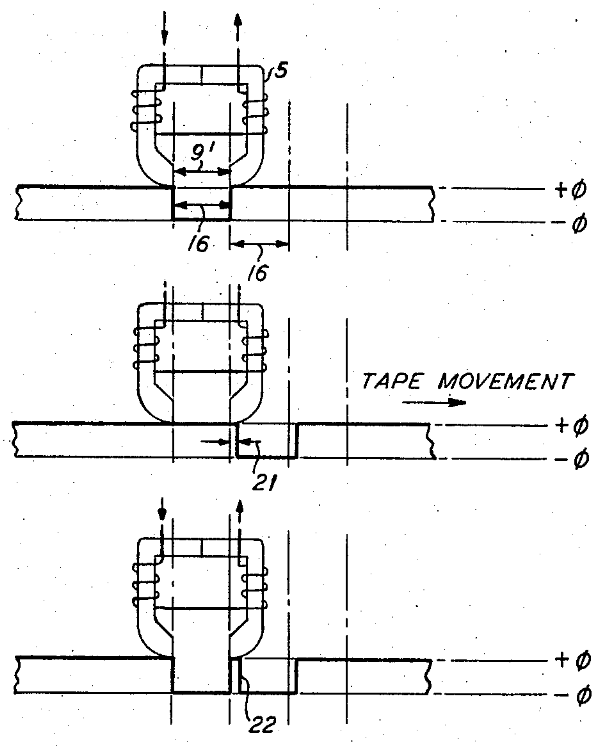
FIG. 7 is a relevant truth table.
FIGS. 8A through 8C illustrate a problem of overstepping.

A "truth table" for the NRZI recording scheme of this invention is shown in FIG. 7. In all, there are eight true and false states since 1's and 0's are written with both $-\phi$ and $+\phi$. In brief, when a 1 is written with $-\phi$ and a 1 is read by vertifier 14, the data was recorded correctly. If a 0 is written with $+\phi$ and a 0 is read by the verifier, the recording was correct. However, when $+\phi$ current pulse is applied to write a 1, the recording is correct if verifier 14 reads a 0. Finally, if a 0 is written with $-\phi$ the recording is correct of a 1 is read. The truth table shows that inversions occur when tape flux resulting from writing of the previous bit is in the $-\phi$ state. These inversions, as noted above, may be readily handled with conventional logic treatment in the write verification circuits.

The above description of this particular NRZI writing scheme was for one gap (one track) but holds true for a multiplicity of parallel gaps (tracks) as in conventional NRZI recording in digital transports. Bit combinations, 1's and 0's, in these tracks considered simultaneously form the necessary characters of computer language. Further, for simplicity a single winding per gap has been shown for both the writing and reading processes. In some instances, two conductively isolated windings per gap might be preferred, one for writing and the other for reading; the techniques of this invention apply equally well to either case.

Pursuant to another aspect of the invention, by making the head gap length 9 fractionally greater than the bit spacing 16 and advantage is achieved that is an indirect consequence of the read-after-write capability of the invention. Specifically, the tape may be overstepped by an amount equal to the difference in length between the bit spacing 16 and gap 9 before a leading transition would escape erasure. This permits the use of practical, readily achievable tolerances for the tape stepping device and permits operation over greater variations in environmental conditions which cause significant changes in tape properties. If the gap length was made only slightly greater, equal to or smaller than the step dimension, the leading transition will escape erasure every time the tape is overstepped. This problem is illustrated in FIGS. 8A through 8C, the amount of overstep shown as 21. The result can be unwanted transitions 22. Pursuant to the invention, by employing a gap length fractionally greater than the step dimension, the problem of unwanted transitions is eliminated but at the same time substantial travel of each magnetic transition beneath the head winding is achieved. A typical head gap length employable in accordance with the invention with the 5 mil bit spacing (for a conventional bit density of 200 per inch) would be 6 mils. Analysis to date indicate that, in general, reliable results pursuant to the invention may be achieved when the step length dimension is from 65 to 95 percent of the length of the gap.

Although the techniques of the present invention have been described largely in terms of a single-channel recorder, it will be recogized that the invention is equally applicable to recording devices having a plurality of channels or track and a corresponding plurality of magnetic gaps. Moreover, while the inventive techniques have been described principally in connection with an incremental-stepping type of recorder, they can be applied also to recorders wherein tape moves at constant speed. Further, although only a single embodiment of the invention and a single associated verification technique have been described herein, it is to be understood that many modifications and variations may be devised by persons skilled in the art without departing from the spirit and the scope of the invention.

What is claimed is:

1. Magnetic tape recording apparatus comprising, in combination:

(a) a magnetic gap having a selected length defined by a leading edge and a trailing edge;

(b) a magnetic tape advanceable lengthwise across said gap;

(c) means responsive to receipt of each successive binary bit for placing a magnetic flux on said tape between said leading and trailing edges; and (d) means responsive to placing of each successive said flux for advancing said tape across said gap in equal steps, the length of each said step being fractionally less than said magnetic gap length and each said step advancing the flux last created beneath said leading edge across said gap to a point adjacent said trailing edge, said last-named flux being replaced by the flux next created beneath said trailing edge;

whereby each said bit received is represented by a tape flux separated from the last-created tape flux by the length of one said step.

2. Apparatus in accordance with claim 1 wherein said tape comprises a plurality of spaced recorded tracks and said magnetic head comprises a plurality of corresponding spaced magnetic gaps, each of said gaps having the same length as defined by a leading edge and a trailing edge, each of said leading edges being located on a first line and each of said trailing edges being located on a second line parallel to said first line, both of said lines being substantially perpendicular to the direction of logitudinal movement of said tape.

3. Magnetic tape recording apparatus comprising, in combination:

(a) a magnetic gap having a selected length defined by a leading edge and a trailing edge;

(b) a magnetic tape advanceable lengthwise across said gap;

(c) means responsive to receipt of each successive binary bit for placing a flux on said tape between said leading and trailing edges, said flux having the same polarity as the adjacent last-recorded tape portion when said bit is a 0 and said flux having the opposite polarity to the adjacent last-recorded tape portion when said bit is a 1; and (d) means responsive to said placing of each successive said flux for stepping said tape across said gap, each said step being fractionally less than said selected magnetic gap length and each said step advancing the flux created beneath said leading edge across said gap but not beyond said trailing edge, whereby said flux created beneath each successive leading edge is replaced by the flux next created beneath said trailing edge and said last-named flux is spaced a distance of one said step away from the flux created beneath said trailing edge of the last-recorded bit.

4. Magnetic tape recording apparatus comprising, in combination:

(a) a magnetic head having a single gap defined by a leading edge and a trailing edge;

(b) a magnetic tape pre-biased with a uniform flux polarity and advanceable lengthwise across said gap;

(c) means responsive to receipt of each successive binary bit for placing a flux on said tape when stationary between said leading and trailing edges, said flux having the same polarity as the adjacent last-recorded tape portion when said bit is a 0 and said flux having the opposite polarity to the adjacent last-recorded portion when said bit is a 1;

(d) means responsive to said placing of each successive said flux for stepping said tape, each said step advancing the flux last created beneath said trailing edge away from said gap and advancing the flux last created beneath said leading edge within said gap to a point adjacent said trailing edge, said last-named flux inducing a signal in said head during said stepping and thereafter being replaced by the flux next created beneath said trailing edge; and (e) means including said head signal induced during said stepping for checking each successive said flux against its corresponding binary input, thereby to ensure the correct flux resulted on said tape for each successive binary input.

5. Magnetic tape recording apparatus comprising, in combination:

(a) a magnetic head having a single gap defined by a leading edge and a trailing edge;

(b) a magnetic tape pre-biased with a uniform positive flux polarity, said tape being advanceable lengthwise across said gap;

(c) means responsive to receipt of each successive binary bit for placing a flux on said tape when stationary between said leading and trailing edges, said flux having the same polarity as the adjacent last-recorded tape portion when said bit is a 0 and said flux having the opposite polarity to the adjacent last-recorded portion when said bit is a 1;

(d) means responsive to said placing of each successive said flux for stepping said tape, each said step advancing the flux last created beneath said trailing edge away from said gap and advancing the flux last created beneath said leading edge within said gap to a point adjacent said trailing edge, said last-named flux inducing a signal in said head during said stepping and thereafter being replaced by the flux next created beneath said trailing edge; and (e) means including said head signals responsive to successive steppings of said tape for ensuring correspondence between the recorded flux and the related binary input, said head signals having a finite magnitude when a binary 1 is written from an initial tape state of positive flux or when a binary 0 is written from an initial tape state of negative flux; and said head signals having essentially zero magnitude when a binary 1 is written from an initial tape state of negative flux or when a binary 0 is written from an initial tape state of positive flux.

6. Apparatus in accordance with claim 5 wherein said magnetic tape is pre-biased with a uniform negative flux polarity and wherein said head signals have a finite magnitude when a binary 1 is written from an initial tape state of negative flux or when a binary 0 is written from an initial tape state of positive flux, and said head signals have essentially a zero magnitude when a binary 1 is written from an initial tape state of positive flux or when a binary 0 is written from an initial tape state of negative flux.

7. Apparatus in accordance with claim 5 wherein said step length is selected at a value of from 65 percent to 95 percent of said gap length.

8. Apparatus in accordance with claim 7 wherein said tape comprises a plurality of spaced recorded tracks and said magnetic head comprises a plurality of corresponding spaced magnetic gaps, each of said gaps having the same length as defined by a leading edge and a trailing edge, each of said leading edges being located on a first line and each of said trailing edges being located on a second line parallel to said first line, both of said lines being substantially perpendicular to the direction of longitudinal movement of said tape.

9. Apparatus in accordance with claim 8 wherein one of said plurality of spaced recorded tracks comprises a parity track and said apparatus further comprises circuit means for comparing said head signals from the other said recorded track with the head signal from said parity track for write verification.

10. Magnetic tape recording apparatus comprising, in combination:

(a) a magnetic head having a leading edge and a parallel trailing edge, said edges defining a magnetic gap of length L;

(b) a magnetic tape;

(c) means responsive to successive binary inputs for applying corresponding electrical pulses to said head, said pulses occurring at uniformly spaced time intervals T thereby to impart a magnetic flux to said tape between said leading and trailing edges; and (d) means advancing said tape lengthwise across said gap at a uniform velocity V, said velocity having a magnitude selected in accordance with the relationship $V<L/T$, said tape advance moving the flux last created beneath said leading edge across said gap toward said trailing edge, said last-named flux being replaced before reaching said trailing edge by the flux next created beneath said trailing edge, whereby each said binary input is represented by a tape flux separated from the last-created tape flux by an amount substantially equal to the product VT.

11. Apparatus in accordance with claim 10 wherein said tape comprises a plurality of spaced recorded tracks and said magnetic head comprises a plurality of corresponding spaced magnetic gaps, each of said gaps having the same length as defined by a leading edge and a trailing edge, each of said leading edges being located on a first line and each of said trailing edges being located on a second line parallel to said first line, both of said lines being substantially perpendicular to the direction of longitudinal movement of said tape.

12. Recording apparatus comprising, in combination:

(a) a magnetic head having a single gap of a selected length, said gap being defined by a leading edge and a trailing edge;
(b) a magnetic tape longitudinally advanceable across said gap;
(c) means responsive to a first binary input for recording on said tape a first leading magnetic condition beneath said leading edge and a like first trailing magnetic condition beneath said trailing edge;
(d) means responsive to recording of said first input for advancing said tape a predetermined distance, said distance being less than said selected length of said gap, said first trailing condition emerging from under said gap and said first leading condition advancing within said gap; and
(e) means responsive to a second binary input for erasing said first leading condition and for recording on said tape a second trailing magnetic condition beneath said trailing edge and a second leading magnetic condition beneath said leading edge, whereby each binary input is represented by a single magnetic condition.

13. Recording apparatus comprising, in combination:
(a) a magnetic head having a single gap of a selected length, said gap being defined by a leading edge and a trailing edge;
(b) a magnetic tape longitudinally advanceable across said gap;
(c) means responsive to a first binary input for recording on said tape a first leading magnetic condition beneath said leading edge and a like first trailing magnetic condition beneath said trailing edge;
(d) means responsive to recording of said first input for advancing said tape a predetermined distance, said first trailing condition emerging from under said gap and said first leading condition advancing within said gap; and
(e) means responsive to a second binary input for erasing said first leading condition and for recording on said tape a second trailing magnetic condition beneath said trailing edge and a second leading magnetic condition beneath said leading edge, said predetermined distance being substantially less than said selected gap length, whereby said first leading edge will still be erased when said tape advancing means advances said tape slightly more than said predetermined distance during an advance.

14. Recording apparatus comprising, in combination:
(a) a magnetic head having a single gap of a selected length, said gap being defined by a leading edge and a trailing edge;
(b) a magnetic tape longitudinally advanceable across said gap;
(c) means responsive to receipt of a first binary input for recording on said tape when stationary first leading and trailing conditions beneath said leading and trailing edges, respectively, said magnetic conditions being of like flux polarity and being spaced by a distance substantially equal to said gap length, each said condition representing said first binary input;
(d) means responsive to recording of said first input for advancing said tape a predetermined distance, said distance being slightly less than said selected length of said gap, said first trailing condition emerging from under said gap and said first leading condition crossing beneath said gap to a point adjacent said trailing edge; and
(e) means responsive to a second binary input for erasing said first leading condition and for recording on said tape when stationary a second trailing magnetic condition beneath said trailing edge and a second leading magnetic condition beneath said leading edge, whereby said first trailing condition and said second trailing condition are spaced by an amount equal to said predetermined distance and each of said input is represented on said tape by a single recorded magnetic condition.

15. Magnetic tape recording apparatus comprising, in combination:
(a) a magnetic head, said head having winding means and a single gap of a selected length defined by a leading edge and a trailing edge;
(b) a magnetic tape longitudinally advanceable across said gap;
(c) means responsive to receipt of a first binary input for recording on said tape when stationary first leading and trailing conditions beneath said leading and trailing edges, respectively, said magnetic conditions being of like flux polarity and being spaced by a distance substantially equal to said gap length, each said condition representing said first binary input;
(d) means responsive to recording of said first input for advancing said tape a predetermined distance, said distance being slightly less than said selected length of said gap, said first trailing condition emerging from under said gap and said first leading condition crossing beneath said gap to a point adjacent said trailing edge, said first leading condition inducing a signal in said winding means during said crossing;
(e) means responsive to a second binary input for erasing said first leading condition and for recording on said tape when stationary a second leading magnetic condition beneath said leading edge and a second trailing magnetic condition beneath said trailing edge; and
(f) circuit means responsive to said signal for comparing said leading condition to said first binary input thereby to verify that the correct flux was applied to said tape for each successive binary input.

16. Recording apparatus in accordance with claim 15 wherein said recording means further comprises means responsive to receipt of a binary 1 for producing adjacent leading and trailing magnetic conditions having opposite flux polarity to the last-recorded magnetic conditions, said means being further responsive to receipt of a binary 0 for producing adjacent leading and trailing magnetic conditions having the same flux polarity as the last-recorded magnetic conditions, whereby the magnetic flux on said tape changes its direction of saturation to represent a binary 1.

17. Recording apparatus in accordance with claim 15 wherein said magnetic tape is pre-biased uniformly with a positive magnetic flux and wherein said circuit means further comprises means for identifying a correct recording of each successive binary bit on said tape on the basis that, for a given advance of said tape, a head signal of finite magnitude occurs if a binary 1 is written from an initial tape state of positive flux or if a binary 0 is written from an initial tape state of negative flux; and a head signal of essentially zero magnitude occurs if a binary 1 is written from an initial tape state of negative flux or if a binary 0 is written from an initial tape state of positive flux.

18. Recording apparatus in accordance with claim 17 wherein said predetermined distance of advance of said tape is fixed at a value of from 65 percent to 95 percent of the length of said gap.

19. Recording apparatus comprising, in combination:
(a) a magnetic head, said head having a plurality of spaced magnetic gaps, each said gap comprising a leading edge and a trailing edge and a winding, each of said leading edges being located on a first line and each of said trailing edges being located on a parallel second line, the distance between respective leading and trailing edges defining a gap length;
(b) a magnetic tape comprising a plurality of spaced recorded tracks, each track being adjacent a respective one of said magnetic gaps and advanceable across said gap in perpendicular relation to said edges;

(c) means responsive to a first binary input for recording on each said track a first leading magnetic condition beneath said leading edge and an adjacent first trailing magnetic condition beneath said trailing edge, said adjacent magnetic conditions being of like flux polarity and each representing the same bit, whereby said leading magnetic condition in aggregate and said trailing magnetic condition in aggregate both represent said first binary input;

(d) means responsive to recording of said first binary input for advancing said tape a predetermined distance, said distance being the desired character spacing and being slightly less than said gap length, each of said first trailing conditions emerging from under their respective gaps, and each of said first leading conditions advancing within their respective gaps to a point adjacent the respective trailing edge thereby inducing a signal in the respective winding; and (e) circuit means responsive to each said head signal for checking each said bit of said binary input against the respective leading magnetic condition thereby to ensure for each track that the polarity of the corresponding trailing magnetic condition correctly represents said binary bit.

20. In an incremental type multi-track binary magnetic tape recorder including means for stepping said tape in nominal increments of uniform preselected distances and means for effecting an NRZI type recording, the improvement comprising, in combination:

(a) a recording head having for each track a single gap with a single winding, said gap having a length greater than said nominal stepping distance;

(b) means responsive to successive inputs in binary form for biasing each said track when stationary beneath its respective gap; and (c) means including each said track bias beneath said gaps responsive to said stepping of said tape for generating signals in respective ones of said head windings, each said signal corresponding to the last binary input recorded and for comparing said signals to said input against the tape biases representing it, whereby each successive said binary input is verified for correctness during the stepping of said tape.

21. Recording apparatus in accordance with claim 20 wherein two windings, conductively isolated, for each said single gap are employed to perform the write and read functions separately.

22. A recording system including binary input means, comprising, in combination:

(a) a recording gap having a selected length defined by a leading edge and a trailing edge;

(b) a recording medium;

(c) means responsive to receipt of each successive binary bit for impressing information on said medium beneath said leading and trailing edges; and (d) means effecting relative movement between said gap and said medium, said movement causing the information last impressed beneath said leading edge to converge with said trailing edge, said last-named information being replaced before said convergence equals said selected length by the information next impressed beneath said recording gap on receipt of the next successive binary bit, whereby each said bit is represented but once on said recording medium.

23. A recording system including binary input means comprising, in combination:

(a) a magnetic gap having a selected length defined by a leading edge and a trailing edge;

(b) a magnetic recording medium;

(c) means responsive to receipt of each succesive binary bit for placing magnetic conditions on said medium beneath said leading and trailing edges; and (d) means effecting relative movement between said gap and said medium, said movement causing the magnetic condition last created beneath said leading edge to converge with said trailing edge, said last-named magnetic condition being replaced before meeting said trailing edge by the magnetic condition next created beneath said trailing edge, whereby each said binary input is represented upon said medium by a single magnetic condition.

24. Apparatus in accordance with claim 23 wherein said convergence of said last-created magnetic condition with said trailing edge induces a signal across said gap and wherein said apparatus further comprises means including said signal for checking each successive flux against its corresponding binary input, thereby to ensure the correct flux resulted on said recroding medium for each binary input.

25. Magnetic recording apparatus comprising, in combination:

(a) a magnetic gap having a selected length defined by a leading edge and a trailing edge;

(b) a recording medium;

(c) means responsive to receipt of each successive binary bit for placing a magnetic flux on said medium between said leading and trailing edges; and (d) means responsive to placing of each successive said flux for effecting a relative stepping movement between said gap and said medium, the length of each said step selected to be fractionally less than said magnetic gap length, and each said step causing the flux last created beneath said leading edge to converge with said trailing edge, said last-named flux being replaced before reaching a point beneath said trailing edge by the flux next created beneath said gap, whereby each said bit is represented by a single tape flux separated from the last-created tape flux by the length of one said step.

26. Magnetic recording apparatus comprising, in combination:

(a) a magnetic head having a leading edge and a parallel trailing edge, said edges defining a magnetic gap of length L;

(b) a magnetic medium;

(c) means responsive to successive binary inputs for applying corresponding electrical pulses to said head, said pulses occurring at uniformly spaced time intervals T thereby to impart a magnetic flux to said magnetic medium between said leading and trailing edges; and (d) means effecting relative movement between said magnetic gap and said medium to achieve therebetween a uniform relative velocity V, said velocity having a magnitude selected in accordance with the relation ship $V<L/T$, said relative movement causing the flux last created beneath said leading edge to converge with said trailing edge, said last-named flux being replaced before reaching said trailing edge by the flux next created beneath said gap, whereby each said binary input is represented on said medium by a flux separated from the last-created flux by an amount substantially equal to the product VT.

References Cited

UNITED STATES PATENTS

| | | | |
|---|---|---|---|
| 3,251,046 | 5/1966 | Ragle et al. | 340—174.1 |
| 3,243,789 | 3/1966 | Ragle | 340—174.1 |
| 3,243,788 | 3/1966 | Maclay | 340—174.1 |

BERNARD KONICK, *Primary Examiner.*

A. I. NEUSTADT, *Assistant Examiner.*